United States Patent [19]

Choi

[11] Patent Number: 5,604,041
[45] Date of Patent: Feb. 18, 1997

[54] METHOD OF MAKING FREE-STANDING POLYIMIDE FILM

[76] Inventor: Jin-o Choi, 253 Wyeth Dr., Getzville, N.Y. 14068

[21] Appl. No.: 557,583

[22] Filed: Nov. 14, 1995

[51] Int. Cl.$^6$ ............................. B32B 27/00; B32B 27/06
[52] U.S. Cl. .................. 428/473.5; 427/154; 427/155; 427/156; 427/240; 427/358; 528/322
[58] Field of Search ..................... 427/154, 155, 427/156, 240, 358; 428/473.5; 528/322

[56] References Cited

U.S. PATENT DOCUMENTS

| 3,759,913 | 9/1973 | Blackley | 524/348 |
| 4,543,295 | 9/1985 | St. Clair et al. | 427/385.5 X |

FOREIGN PATENT DOCUMENTS 61-55177  8/1984  Japan.

*Primary Examiner*—Michael Lusignan
*Attorney, Agent, or Firm*—Richard D. Fuerle; Arthur S. Cookfair

[57] ABSTRACT

Disclosed is a method of making a free-standing polyimide film. A solution is prepared of a polyamic acid 20 to 98% imidized in an organic solvent and a coating of the solution is applied to a non-stick substrate. The coating is heated to a temperature high enough to evaporate all but 1 to 20 wt % of the solvent and form a film. The film is removed from the substrate and is heated to evaporate the solvent to less than 1000 ppm.

20 Claims, No Drawings

METHOD OF MAKING FREE-STANDING POLYIMIDE FILM

BACKGROUND OF THE INVENTION

This invention relates to a method of making a free-standing single layer polyimide film that is approximately equally adhesive on both sides. In particular, it relates to heating a coating on a substrate of a solution of a partially imidized polyamic acid to a temperature high enough to form a film, then hard baking the free-standing film after it has been removed from the substrate.

Adhesive films are used in the electronics industry for a variety of purposes such as, for example, bonding a metal lead frame to an integrated circuit chip. Polyimides are often used to make these films because they are good insulators, are stable at high temperatures, and bond well under heat and pressure. In a current commercial manufacturing process for producing single layer adhesive polyimide films, a solution of a partially imidized polyamic acid is cast onto a low surface tension surface or a release surface and is baked at about 250° C; the resulting polyimide film is peeled from the surface. However, this process results in a film whose top surface bonds better than its bottom surface. That is, after bonding films made by the current process between two identical surfaces, the surface bonded to the top of the film adheres better than the surface bonded to the bottom of the film. This is true regardless of what kind of non-stick substrate is used for casting the solution of partially imidized polyamic acid when the film is prepared. It is desirable for the bottom and top surfaces to be equally adhesive, especially if this result can be achieved by increasing the adhesiveness of the bottom surface.

SUMMARY OF THE INVENTION

I have discovered a method of making single layer free-standing adhesive polyimide films where both surfaces are approximately equally adhesive. I was able to achieve this result by heating the solution of partially imidized polyamic acid on the substrate to a temperature high enough to form a film that can be removed and handled, but not high enough to remove substantially all of the solvent. I then remove the film from the substrate and complete heating it at at least the Tg temperature and the boiling point of solvents while it is not in contact with any substrate. When film is made in this way, both surfaces are about equally adhesive, regardless of the substrate onto which the partially imidized polyamic acid solution is cast. Moreover, this result is achieved by increasing the adhesiveness of the bottom side, not by reducing the adhesiveness of the top side.

Surprisingly, I have also found that many of the mechanical properties of film made according to the process of this invention are improved or altered, including tensile modulus, break elongation, yield strength, and coefficient of thermal expansion.

DESCRIPTION OF THE PREFERRED EMBODIMENTS

The polyamic acids of this invention are prepared by reacting an aromatic dianhydride with a diamine. Generally, stoichiometric quantities of diamine and dianhydride are used to obtain the highest molecular weight polyamic acid but the equivalent ratio of dianhydride to diamine can range from 1:2 to 2:1.

Examples of suitable aromatic dianhydrides include:

1,2,5,6-naphthalene tetracarboxylic dianhydride;
1,4,5,8-naphthalene tetracarboxylic dianhydride;
2,3,6,7-naphthalene tetracarboxylic dianhydride;
2-(3',4'-dicarboxyphenyl) 5,6-dicarboxybenzimidazole dianhydride;
2-(3',4'-dicarboxyphenyl) 5,6-dicarboxybenzoxazole dianhydride;
2-(3',4'-dicarboxyphenyl) 5,6-dicarboxybenzothiazole dianhydride;
2,2',3,3'-benzophenone tetracarboxylic dianhydride;
2,3,3',4'-benzophenone tetracarboxylic dianhydride;
3,3',4,4'-benzophenone tetracarboxylic dianhydride (BTDA);
2,2',3,3'-biphenyl tetracarboxylic dianhydride;
2,3,3',4'-biphenyl tetracarboxylic dianhydride;
3,3',4 4'-biphenyl tetracarboxylic dianhydride(BPDA);
bicyclo-[2,2,2]-octen-(7)-2,3,5,6-tetracarboxylic-2,3,5,6-dianhydride;
thio-diphthalic anhydride;
bis (3,4-dicarboxyphenyl) sulfone dianhydride;
bis (3,4-dicarboxyphenyl) sulfoxide dianhydride;
bis (3,4-dicarboxyphenyl oxadiazole-1,3,4) paraphenylene dianhydride;
bis (3,4-dicarboxyphenyl) 2,5-oxadiazole 1,3,4-dianhydride;
bis 2,5-(3',4'-dicarboxydiphenylether) 1,3,4-oxadiazole dianhydride;
bis (3,4-dicarboxyphenyl) ether dianhydride or 4,4'-oxydiphthalic anhydride (ODPA);
bis (3,4-dicarboxyphenyl) thioether dianhydride;
bisphenol A dianhydride;
bisphenol S dianhydride;
2,2-bis (3,4-dicarboxyphenyl) hexafluoropropane dianhydride or 5,5-[2,2,2-trifluoro-1-(trifluoromethyl)ethylidene]bis-1,3-isobenzofurandione) (6FDA);
hydroquinone bisether dianhydride;
bis (3,4-dicarboxyphenyl) methane dianhydride;
cyclopentadienyl tetracarboxylic acid dianhydride;
cyclopentane tetracarboxylic dianhydride;
ethylene tetracarboxylic acid dianhydride;
perylene 3,4,9,10-tetracarboxylic dianhydride;
pyromellitic dianhydride (PMDA);
tetrahydrofuran tetracarboxylic dianhydride; and resorcinol dianhydride.

The dianhydrides can be used in their tetraacid form or as mono, di, tri, or tetra esters of the tetra acid, but the dianhydride form is preferred because it is more reactive. The preferred dianhydrides are ODPA, BPDA, BTDA, 6FDA, and PMDA or mixtures thereof, as these dianhydrides are readily available and have been found to give superior properties. The most preferred dianhydride is ODPA because it gives a polyimide-siloxane having better adhesion and good flexibility.

The diamine used in preparing the polyamic acid is preferably aromatic as aromatic diamines give polyimides having the best properties. Examples of aromatic diamines include:
m- and p-phenylenediamine;
2,4-diaminotoluene (TDA);
2,5- and 2,6-diaminotoluene;
p- and m-xylenediamine;
4,4'-diaminobiphenyl;
4,4'-diaminodiphenyl ether or 4,4'-oxydianiline (ODA);
3,4'-oxydianiline;
4,4'-diaminobenzophenone;
3,3',3,4', or 4,4-diaminophenyl sulfone or m,m-, m,p- or p,p-sulfone dianiline;

4,4'-diaminodiphenyl sulfide;
3,3'-diaminodiphenyl sulfone (APS);
3,3'or 4,4'-diaminodiphenylmethane or m,m- or p,p-methylene dianiline;
3,3'-dimethylbenzidine;
2,2'-bis[(4-aminophenyl)-1,4-diisopropyl]benzene or 4,4'-isopropylidenedianiline or bisaniline P(BAP);
2,2'-bis[(4-aminophenyl)-1,3-diisopropyl]benzene or 3,3'-isopropylidenedianiline or bisaniline M;
methylene dianiline;
1,4-bis(4-aminophenoxy)benzene;
1,3-bis(4-aminophenoxy)benzene;
1,3-bis(3-aminophenoxy)benzene (APB);
4,4'-bis(4-aminophenoxy)biphenyl;
2,4-diamino-5-chlorotoluene;
2,4-diamino-6-chlorotoluene;
2,2-bis-[4(4-aminophenoxy)phenyl] propane (BAPP);
trifluoromethyl-2,4-diaminobenzene;
trifluoromethyl-3,5-diaminobenzene;
2,2-bis(4-aminophenyl)-hexafluoropropane (6F diamine);
2,2-bis(4-phenoxy aniline) isopropylidene;
2,4,6-trimethyl-1,3-diaminobenzene;
4,4'-diamino-5,5'-trifluoromethyl diphenyloxide;
3,3'-diamino-5,5'-trifluoromethyl diphenyloxide;
4,4'-trifluoromethyl-2,2'-diamino biphenyl;
2,5-dimethyl-1,4-phenylenediamine (DPD);
2,4,6-trimethyl-1,3-diaminobenzene;
diaminoanthraquinone;
4,4'-oxybis[(2-trifluoromethyl)benzeneamine] (1,2,4-OBA-BTF);
4,4'-oxybis[(3-trifluoromethyl)benzeneamine];
4,4'-thiobis[(2-trifluoromethyl)benzeneamine];
4,4'-thiobis[(3-trifluoromethyl)benzeneamine];
4,4'-sulfoxylbis[(2-trifluoromethyl)benzeneamine];
4,4'-sulfoxylbis[(3-trifluoromethyl)benzeneamine];
4,4'-ketobis[(2-trifluoromethyl)benzeneamine];
4,4'-[(2,2,2-trifluoromethyl-1-(trifluoromethyl)-ethylidine)bis(3-trifluoromethyl)benzeneamine];
4,4'-dimethylsilylbis[(3-trifluoromethyl)benzeneamine].

The preferred aromatic diamines are TDA, APB, DPD, and BAPP due to the excellent properties of film made using them.

Preferably, the polyamic acid is prepared using a mixture of a diamine that does not contain siloxane groups and a diamine that contains siloxane groups or from a mixture of a dianhydride that contains siloxane groups and a dianhydride that does not contain siloxane groups. The siloxane-containing compounds may be either aromatic or non-aromatic, but non-aromatic compounds are preferred as they are more readily available. Examples of siloxane diamines that can be used include diamines having the formula

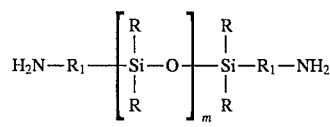

Examples of siloxane dianhydrides that can be used include compounds having the formula

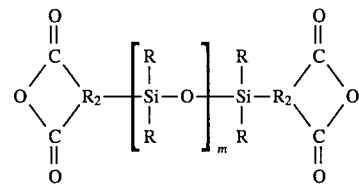

where R, $R_1$, and $R_2$ are mono, di, and triradicals, respectively, each independently selected from a substituted or unsubstituted 1 to 12 carbon atom aliphatic group or a substituted or unsubstituted 6 to 10 carbon atom aromatic group. Examples of monoradicals include —$CH_3$, —$CF_3$, —$CH{=}CH_2$, —$(CH_2)_nCF_3$, —$CF_6H_5$, —$CF_2$—$CHF$—$CF_3$, and

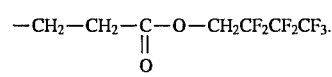

Examples of diradicals include
—$(CH_2)_n$—, —$(CF_2)_nCF_2$—, and —$C_6H_4$—. Examples of triradicals include

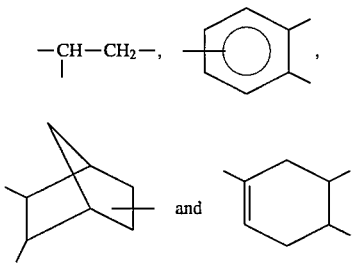

where n=1 to 10 and m is 1 to 200, but is preferably 1 to 12. (Siloxane diamines are herein denoted by the notation "$G_m$".) To prepare a polyimidesiloxane film, the polyamic acid can be made from about 1 to about 80 wt % siloxane-containing monomers and about 20 to about 99 wt % monomers that do not contain siloxane. Preferably, it is made from about 1 to about 30 wt % siloxane-containing monomers and about 70 to about 99 wt % monomers that do not contain siloxane.

The polyamic acid is typically prepared in solution. The solvent used to form the solution of the polyamic acid must, of course, dissolve the polyamic acid. Suitable solvents depend upon the particular composition of the polyamic acid that is to be made and dissolved, but may include N-methyl-2-pyrrolidone (NMP), diglyme, triglyme, cyclohexanone, cyclopentanone, dimethylacetamide, and mixtures of these solvents. The solvent preferably has a boiling point between 130° and 210° C. as lower boiling solvents may evaporate too readily from the completed film and higher boiling solvents may be too difficult to remove from the film. The polyamic acid solution can be about 10 to about 40 wt % solids, but is preferably about 25 to about 35 wt % solids as more dilute solutions mean more solvent to evaporate and more concentrated solutions are too viscous. Particularly preferred polyamic acid adhesives can be made from ODPA, APB, and $G_9$ in NMP, and from BPDA, BTDA, BAPP, $G_1$, and DPD in NMP. The reaction that forms the polyamic acid occurs at about room temperature.

The polyamic acid is then partially imidized. This can be accomplished chemically by, for example, the addition of acetic anhydride, or by heating, preferably at about 130° to about 170° C. About 20 to about 98% of the amic acid groups should be imidized; preferably, about 90 to about 98% of the amic acid groups are imidized, so that heating on the substrate primarily evaporates solvent. The amount of imidization that has occurred can be determined by infrared spectrum analysis, by measuring the amount of water given off in forming the imide groups, or by heating to predetermined times, drying, and titrating the polyamic acid to determine the relationship between the heating time and the percent imidization. The amount of heat necessary to achieve a particular percent imidization will depend upon the particular monomers used.

The substrate onto which the solution of partially imidized polyamic acid is cast should be a non-stick surface such as polytetrafluoroethylene (PTFE) or polyethylene terephthalate (PET), stainless steel, or aluminum coated with a release agent such as PTFE or a silicone. Casting can be performed at room temperature using a doctor blade, spin coating, or other suitable means.

The coated substrate is then heated to a temperature high enough to form a film that can be stripped from the substrate and handled without damage. Such a film generally forms when most (i.e., typically 80 to 99%) of the solvent has been vaporized. It is desirable to heat to near but below the boiling point of the solvent as it is important to keep at least 1 wt % solvent in the film. While the required temperature range will depend upon the particular dianhydrides and diamines from which the polyamic acid has been prepared and the solvents used, an adequate temperature range is generally about 120° to about 200° C. The film is then removed, such as by peeling, from the substrate and is supported at its edges. The film can be about 10 to about 1000 microns thick; a preferred range is about 30 to about 100 microns.

Finally, the free-standing film, supported at its edges, is hard baked at temperatures about or higher than its Tg and the boiling point of solvents, for example, at 200° to 300° C. for about 2 hours. This removes solvent to a level below 1000 ppm and fully imidizes the amic acid groups so that the polymer is at least 99% imidized. While I do not wish to be bound by any theories, I believe that polymer segments that are more adhesive migrate to the surface of the film during this hard baking, and that equalizes the adhesiveness of the top and bottom surfaces of the film. The hard-baked imidized film is non-tacky at room temperature and can be rolled up until used. To use as an adhesive film it can be pressed between two surfaces heated to about 250° to about 350° C. for about 60 seconds.

The following examples further illustrate this invention.

EXAMPLE 1

To a 1 liter 3-necked flask equipped with a mechanical stirrer, a reflux condenser, a Dean-Stark trap, and a thermometer was added 500 ml dry NMP, followed by, with stirring, 30.3 g (0.1031 mole) BPDA, 14.2 g (0.044 mole) BTDA, and 7.4 g (0.0294 mole) $G_1$. The reaction mixture was stirred at room temperature for 4 hours and 36.1 g (0.088 mole) BAPP and 4 g (0.0294 mole) 2,5-dimethyl-1, 4-phenylenediamine (DPD) were added. The mixture was stirred overnight at room temperature. For imidization in the solution, 95 ml toluene was added with stirring and the temperature was raised to 155° C. and refluxed for 4 hours. The aqueous phase was removed in a Dean-Stark trap. The viscosity of this solution was 3,800 mPa.s (cps) and the imidization was 96%, as measured by the acid titration method.

EXAMPLES 2 and 3

Example 1 was repeated using similar conditions at different solid contents for various reflux times. The following table shows the reflux condition, the viscosity of the solution, and the imidization.

| Example | Solid Content (wt %) | Reflux Temp. (°C.) | Reflux Time (hrs) | Imidization (%) | Viscosity (mPa · s) |
|---|---|---|---|---|---|
| 1 | 15 | 155 | 4 | 96.1 | 3800 |
| 2 | 25 | 145 | 1.5 | 93.3 | 65800 |
| 3 | 22 | 142–163 | 2 | 93 | 24400 |

Since the viscosity of the solution was very high in Example 2, it was diluted to about 10,000 to 20,000 mPa.s (cps) by adding NMP before casting on a substrate.

EXAMPLE 4

The solution of Example 3 was mixed with a defoaming agent, sold as Dow Corning 7 additive (0.05%), and a leveling agent, sold as 3M FC431 (0.01%), and was cast onto the release side of three 0.127 mm (5 mil) polyester substrates using a 0.762 mm (30 mil) blade; and the samples were put into a convection oven. In the first step, the temperature of the three samples was raised from room temperature to 160° C., 190° C. and 220° C., respectively, at 8° C./min rate, and they were soft-baked at those temperatures for 60 minutes. The soft-baked films peeled off and the residual NMP of the soft-baked films was measured with gas chromatography (GC) by dissolving in dimethyl acetamide.

| Soft-Baking Condition | Residual NMP |
|---|---|
| 160° C./60 min | 10 wt % |
| 190° C./60 min | 4.6 wt % |
| 220° C./60 min | 1.7 wt % |

In the second step, the three free-standing films were put back into the oven. The temperature was raised to 270° C. at 8° C./min and the films were baked again for 60 minutes. The residual NMP of the three films after the second baking was less than 100 ppm (from GC measurement by diffusing out NMP in dimethyl acetamide). The 6.35 mm (¼ inch) wide films were bonded to iron-nickel alloy (Alloy 42) substrates at 300° C. for 60 seconds at 3.45 MPa (500 psi) pressure. The peel strengths were measured by pulling the films from the substrates at a 90-degree angle at room temperature. The peel strengths of three films prepared by the two-step process are shown below.

| Baking Condition | Top (air) Side | Back (Release) Side |
|---|---|---|
| 160° C./60 min 270° C./60 min | 1.2 kg/cm | 1.5 kg/cm |
| 190° C./60 min 270° C./60 min | 1.4 kg/cm | 1.2 kg/cm |
| 220° C./60 min 270° C./60 min | 1.4 kg/cm | 0.9 kg/cm |

To compare the two-step process with a single-step process, a film was cast using the same resin solution onto a polytetrafluoroethylene coated aluminum foil, the oven temperature was raised from room temperature at an 8° C. rate, and the film was baked at 160° C. for 30 minutes and at 270° C. for 60 minutes without peeling off. The peel strength of the film prepared by this single step process was:

| Baking Condition | Top (air) Side | Back (coated) Side |
|---|---|---|
| 160° C./30 min<br>270° C./60 min | 1.3 kg/cm | 0.6 kg/cm |

The solution of Example 2 was mixed with 0.05% Dow Corning 7 additive and 0.01% 3M FC431 additive to improve leveling, and was cast onto the release side of 0.127 mm (5 mil) polyester substrates by using a 0.635 mm (25 mil) blade. For the two-step process of film preparation, the soft-baked films were peeled off the polyester substrates after baking at about 160° to 170° C. The standing films were baked again at a higher temperature of about 240° to 275° C., while the ramping rate of the convection oven was 8° C./min. Both sides of the films were bonded to Alloy 42 coupons at 300° C. and 3.45 MPa (500 psi) for 60 seconds. The peel strengths of these samples, which were made by the two-step process of this invention, is shown below.

| Baking Condition | Top (air) Side Film | Back (release) Side |
|---|---|---|
| 1st: 160° C., 60 min<br>2nd: 240° C., 60 min | 1.4 kg/cm | 1.4 kg/cm |
| 1st: 160° C., 60 min<br>2nd: 250° C., 60 min | 1.2 kg/cm | 1.5 kg/cm |
| 1st: 170° C., 60 min<br>2nd: 260° C., 60 min | 1.2 kg/cm | 1.2 kg/cm |
| 1st: 170° C., 60 min<br>2nd: 275° C., 60 min | 1.2 kg/cm | 1.2 kg/cm |

For the single step process of film preparation, the same solution was cast on the release side of 0.05 mm (2 mil) stainless steel foil, which was coated with silicone release agent by electon beam curing. The coating on the stainless steel foil was baked at 170° C. for 30 minutes and then at 275° C. for 60 minutes in a convection oven with an 8° C./min ramping rate. The peel strength measured by the same method as described above was 1.8 kg/cm for the top side; the back side of the film had no adhesion.

EXAMPLE 5

Films, about 0.051 to 0.076 mm (2 to 3 mils) thick, were prepared using the prior art single step process and the two-step process of this invention as described in Example 4. The mechanical properties of the films were tested. The following table gives the results.

This example shows that films made according to the process of this invention had a lower modulus, a higher break elongation, a higher yield strength, and a higher coefficient of thermal expansion when compared to films made by the prior art process.

We claim:

1. A method of making a free-standing polyimide adhesive film comprising (A) preparing a solution which comprises a polyamic acid dissolved in a solvent;

(B) imidizing about 20 to about 98% of the amic acid groups in said polyamic acid by heating or chemically;

(C) forming a coating of said solution on a non-sticking substrate;

(D) heating said coating at a temperature sufficient to remove 80 to 99 wt % of said solvent and form a film that can be removed from said substrate and handled;

(E) removing said film from said substrate; and (F) heating said free-standing film at a temperature sufficient to reduce the amount of solvent therein to less than 1000 ppm.

2. A method according to claim 1 wherein said polyamic acid comprises the reaction product of a diamine with a dianhydride selected from the group consisting of oxydiphthalic anhydride, 3,3',4,4'-biphenyl tetracarboxylic dianhydride, 3,3',4,4'-benzophenone tetracarboxylic dianhydride, 2,3-bis(3,4-dicarboxylphenyl) hexafluoropropane dianhydride, and pyromellitic dianhydride.

3. A method according to claim 1 wherein said polyamic acid comprises the reaction product of a dianhydride with a diamine selected from the group consisting of 2,4-diaminotoluene, 1,3-bis(3-aminophenoxy)benzene, 2,5-dimethyl-1, 4-phenylenediamine, and 2,2-bis(4-[4-aminophenoxy]phenyl)propane.

4. A method according to claim 1 wherein said polyamic acid includes siloxane groups.

5. A method according to claim 1 wherein said polyamic acid is the reaction product of an aromatic dianhydride, about 20 to about 99 wt % of an aromatic diamine that does not contain siloxane groups, and about 1 to about 80 wt % of a diamine having the formula

| Method of Preparation | Final Baking Temperature | Yield[1] | | Break[1] | | Modulus[1] (GPa) | Coefficient of Thermal Expansion[2] (ppm/°C.) |
|---|---|---|---|---|---|---|---|
| | | Elongation (%) | Strength (kPa) | Elongation (%) | Strength (kPa) | | |
| Prior Art Process | 250° C. 60 min | 12.4 | 99 | 14.9 | 97 | 3.2 | — |
| | 275° C. 60 min | 7.0 | 92 | 10.2 | 83 | 2.7 | 83 |
| Process of This Invention | 250° C. 60 min | 10.7 | 101 | 36.4 | 97 | 2.3 | — |
| | 275° C. 60 min | 10.4 | 100 | 40.3 | 94 | 2.2 | 94 |

[1]ASTM Test No. D882
[2]Measured by thermal mechanical analyzer

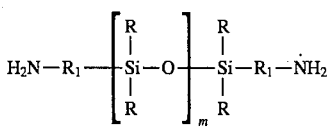

where R and $R_1$ are mono and diradicals, respectively, each independently selected from a substituted or unsubstituted 1 to 12 carbon atom aliphatic group or a substituted or unsubstituted 6 to 10 carbon aromatic group and m is 1 to 200.

6. A method according to claim 1 wherein said solvent is N-methyl-2-pyrrolidone.

7. A method according to claim 1 wherein said heating in step (D) is near but below the boiling point of said solvent.

8. A method according to claim 1 wherein said heating in step (D) is at about 120° to about 200° C.

9. A method according to claim 1 wherein said heating in step (F) is at about 200° to about 300° C.

10. A method according to claim 1 wherein said coating on said substrate is formed using a doctor blade or spin coating.

11. A free-standing polyimide adhesive film made according to the method of claim 1.

12. In a process for making a free-standing polyimide adhesive film wherein a solution of a polyamic acid 90 to 98% imidized is cast on a substrate and is heated to form a film which is removed from said substrate, a method of equalizing the adhesiveness of the top and bottom of said film comprising restricting said heating to a temperature that vaporizes all but 1 to 20 wt % of the solvent in said film and, after said film is removed from said substrate, heating it to a temperature sufficient imidize polyamic acid groups and to reduce the solvent content of said film to less than 1000 ppm.

13. A method according to claim 12 wherein said heating to vaporize solvent is at about 120° to about 200° C. and said heating to imidize is at about 200° to about 300° C.

14. A free-standing polyimide film made according to the method of claim 12.

15. A method of making a free-standing adhesive polyimidesiloxane single-layer film comprising (A) forming a solution of about 20 to about 40% solids which comprises (1) a polyamic acid which is the reaction product of an aromatic dianhydride with diamine, where said diamine is about 70 to about 99 wt % aromatic diamine that does not contain siloxane groups and about 1 to about 30 wt % of a diamine that contains siloxane groups, where the molar ratio of said dianhydride to total diamine is about 1:2 to about 2:1; and (2) an organic solvent for said polyamic acid;

(B) heating said solution to imidize 90 to 98% of the amic acid groups in said polyamic acid;

(C) forming a coating of said solution on a substrate;

(D) heating said coating on said substrate to a temperature sufficient to vaporize all but 1 to 20 wt % of said solvent and form a film that can be removed from said substrate without damage;

(E) removing said film from said substrate; and (F) heating said film to a temperature sufficient to reduce the solvent content of said film to less than 1000 ppm and fully imidize the polymer.

16. A method according to claim 15 wherein said diamine that contains siloxane groups has the formula

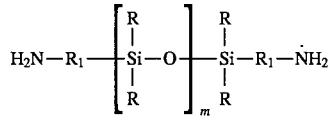

where R and $R_1$ are mono and diradicals, respectively, each independently selected from a substituted or unsubstituted 1 to 12 carbon atom aliphatic groups or a substituted or unsubstituted 6 to 10 carbon aromatic groups and m is 1 to 200.

17. A method according to claim 15 wherein said polyamic acid comprises the reaction product of a diamine with a dianhydride selected from the group consisting of oxydiphthalic anhydride, 3,3',4,4'-biphenyl tetracarboxylic dianhydride, 3,3',4,4'-benzophenone tetracarboxylic dianhydride, 2,3-bis(3,4-dicarboxylphenyl) hexafluoropropane dianhydride, and pyromellitic dianhydride.

18. A method according to claim 15 wherein said polyamic acid comprises the reaction product of a dianhydride with a diamine selected from the group consisting of 2,4-diaminotoluene, 1,3-bis(3-aminophenoxy)benzene, 2,5-dimethyl-1,4-phenylenediamine and 2,2-bis(4-[4-aminophenoxy]phenyl)propane.

19. A free-standing polyimide film made according to the method of claim 15.

20. A method according to claim 19 wherein said film is about 30 to about 100 microns thick.

\* \* \* \* \*